United States Patent [19]

Howes

[11] 4,235,828
[45] Nov. 25, 1980

[54] FUEL ECONOMIZER EMPLOYING IMPROVED TURBULENT MIXING OF FUEL AND AIR

[76] Inventor: Leslie D. Howes, 202 Queen Mary Way, Queen Valley, Apache Junction, Ariz. 85220

[21] Appl. No.: 50,183

[22] Filed: Jun. 20, 1979

[51] Int. Cl.³ .............................................. F02M 23/00
[52] U.S. Cl. ................................. 261/78 R; 48/180 A; 123/585; 261/DIG. 57
[58] Field of Search ..................... 261/DIG. 57, 78 R; 48/180 A; 123/119 D

[56] References Cited

U.S. PATENT DOCUMENTS

| | | | |
|---|---|---|---|
| 871,134 | 11/1907 | Monnier et al. | 261/DIG. 57 |
| 1,086,287 | 2/1914 | Gehrmann | 261/DIG. 57 |
| 1,099,504 | 6/1914 | Kutscher | 123/119 D |
| 1,199,747 | 9/1916 | Benham | 48/180 A |
| 1,403,003 | 1/1922 | Beatson | 48/180 A |
| 1,418,499 | 6/1922 | Washburn | 261/DIG. 57 |
| 1,857,321 | 5/1932 | Nemec | 138/4 SA |
| 2,094,959 | 10/1937 | Pulidori | 261/78 R |
| 2,326,598 | 8/1943 | Acosta | 48/180 A |
| 2,995,895 | 8/1961 | Howes | 60/39.5 S |
| 2,998,198 | 8/1961 | Young | 138/4 S |
| 3,496,722 | 2/1970 | Howes et al. | 60/39.6 S |
| 4,000,224 | 12/1976 | Phelps | 261/DIG. 57 |
| 4,003,968 | 1/1977 | Rickert | 261/DIG. 57 |
| 4,100,898 | 7/1978 | Mineck | 123/119 D |

FOREIGN PATENT DOCUMENTS 1300052 12/1972 United Kingdom .

Primary Examiner—Tim R. Miles
Attorney, Agent, or Firm—Warren F. B. Lindsley

[57] ABSTRACT

A fuel economizer for internal combustion engines which increases turbulence of the fuel and air mixture in the carburetor by decreasing the throat of its venturi to a predetermined minimum necessary to induce fuel flow through its fuel jets and then downstream of the venturi adding further atmospheric air for complete combustion.

3 Claims, 7 Drawing Figures

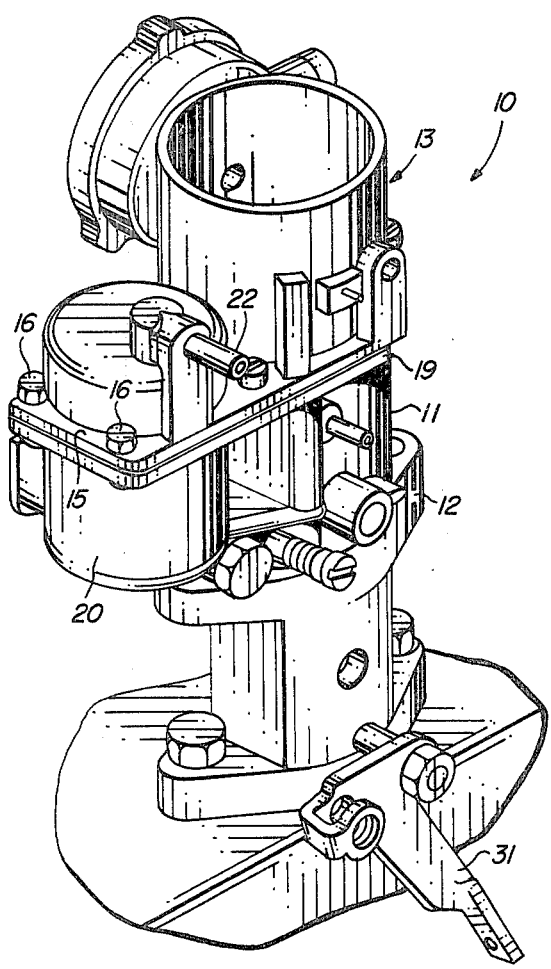
Fig. 1
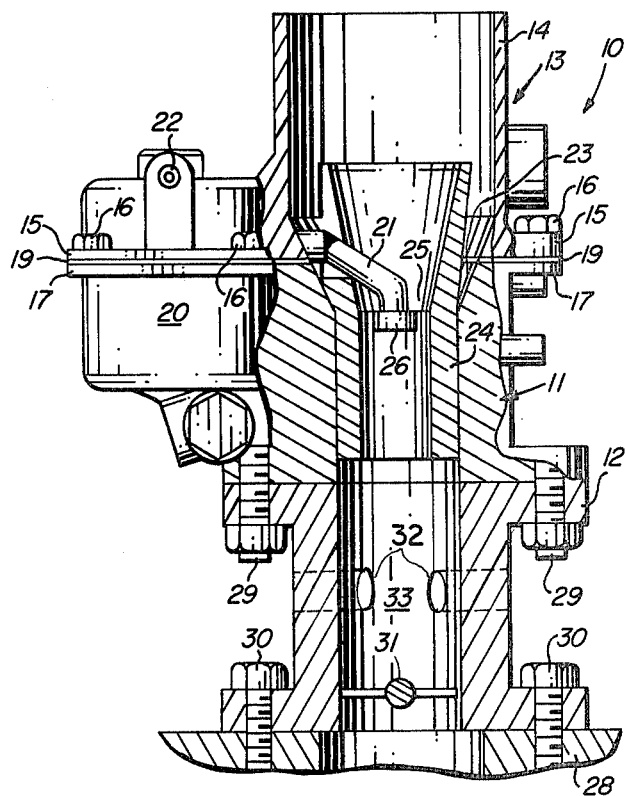
Fig. 2
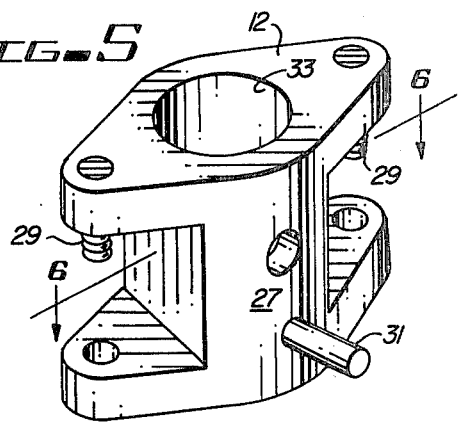
Fig. 5
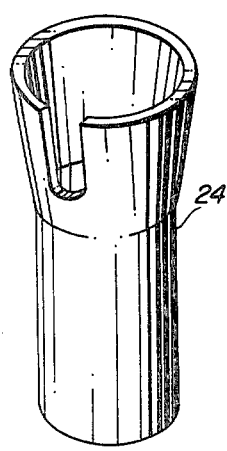
Fig. 3
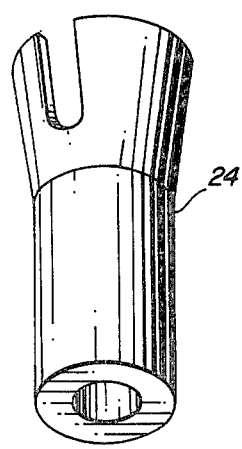
Fig. 4
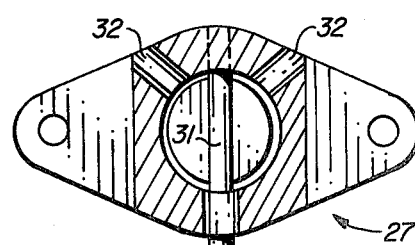
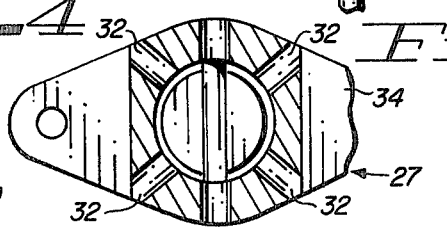
Fig. 6
Fig. 7

FUEL ECONOMIZER EMPLOYING IMPROVED TURBULENT MIXING OF FUEL AND AIR

BACKGROUND OF THE INVENTION

One of the most important parts of an internal combustion engine is its carburetor. Unless the carburetor performs well the engine will not start reliably, will not run smoothly and deliver adequate power and good gasoline mileage, and will produce excessive atmospheric pollutants.

Because the proper operation of the carburetion system is so essential to total engine performance, much attention has been given in the past to carburetor design and over the years the carburetor has become a complex device.

The complexity of the modern carburetor is apparent when it is recognized that the typical carburetor system employs six separate systems, i. e. a float system for controlling the level of fuel in the bowl; a low speed or idling system to provide an adequate fuel supply when air intake is low; a high speed or cruising system to overcome fuel inertia during a sudden increase in power demand; a power system to provide adequate fuel under conditions of reduced vacuum resulting from the opening of the throttle; and a choke system for increasing the fuel-to-air ratio under starting or low temperature conditions.

In addition, there are anti-percolation vents, hot idle compensators, anti-dieseling solenoids and deceleration controls in most modern carburetors.

This multitude of special systems and features requires careful adjustment and maintenance and the many small ducts and valves are vulnerable to blockage and wear by dust and dirt finding their way through the air filter.

Furthermore, until recently there has been a greater emphasis on certain aspects of performance such as starting, acceleration and power developed with insufficient emphasis given to gasoline mileage and atmospheric polluting conditions.

Thus, a need exists for a new carburetor which will produce a better balance in total performance while utilizing a simpler design that does not require the numerous separate systems and special accessories and which provides in particular improved gas mileage and a lower level of atmospheric pollution.

DESCRIPTION OF THE PRIOR ART

U.S. Pat. No. 1,403,003 discloses a device for supplying additional air to internal combustion engines on the closing movement only of the carburetor throttle thus enabling the rich gas mixture required for power to be weakened when the engine is throttled and the power not required.

U.S. Pat. No 2,326,598 discloses an auxiliary intake device adapted to introduce pure air into the fuel leaving the carburetor to increase the breaking up of the fuel particles to more thoroughly mix the air and fuel combination.

The British Pat. No. 1,300,052 discloses a manifold system for internal combustion engines that employs a sleeve in the bore between the choke and the throttle valve restricting the cross-sectional area of the bore to a lesser degree than the choke while at the same time reducing the effective cross section of the orifice provided by the valve opening into the choke.

SUMMARY OF THE INVENTION

In accordance with the invention claimed, an improved and greatly simplified carburetor is provided which increases turbulence of the fuel air mixture in an improved manner to meet the full range of operating requirements.

It is, therefore, one object of this invention to provide an improved carburetor means for an internal combustion engine which add the necessary turbulence to the fuel air mixture to the engine to increase gas mileage by substantial total fuel consumption.

Another object of this invention is to divide the total venturi area into several orifices, one of which is centrally located in the throat area of the venturi for asperating the main fuel jet flow and the others arranged downstream thereof for maintaining the necessary air for complete combustion.

A further object of this invention is to provide an improved carburetor employing reduced venturi size to increase fuel injection and turbulence and which compensates for reduced air intake through the venturi by supplement air injection downstream of the fuel injection means.

A still further object of this invention is to provide an improved carburetor employing increased turbulence of the fuel with a decreased air supply in the carburetor venturi and means for introducing pure air into the fuel air mixture leaving the carburetor.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a perspective view of an improved carburetor embodying the invention;

FIG. 2 is a cross-sectional view of FIG. 1 showing a venturi shaped insert positioned in the throat of the carburetor for reducing its fuel mixing chamber, FIG. 3 is an enlarged perspective view of the venturi shaped insert shown in FIG. 2;

FIG. 4 is another perspective view of the venturi shaped insert shown in FIGS. 2 and 3;

FIG. 5 is a perspective view of the throat extension of the carburetor shown in FIG. 1;

FIG. 6 is a cross-sectional view of FIG. 5 taken along the line 6—6; and

FIG. 7 is a partial cross-sectional view similar to FIG. 6 showing a modification of the throat extension shown in FIG. 5.

DESCRIPTION OF THE PREFERRED EMBODIMENT

Referring more particularly to the drawing by characters of reference, FIGS. 1-6 discloses an improved carburetor 10 comprising a carburetor housing 11 rigidly secured between a throttle plate housing 12 at one end and an open cylindrically shaped air filter mounting 13 at its other end. The air filter mounting 13 comprises an open-ended cylinder 14 having a flange 15 at one end through which bolts 16 extend for fastening the mounting 13 to the top of flange 17 on top of carburetor housing 11.

The top opening 18 of cylinder 14 is the air inlet of the carburetor and around which an air filter (not shown) may be mounted. If desired, a suitable resilient or cork-like material 19 may be fitted on top of flange 17 of housing 11 and between this flange and flange 15 of air filter mounting 13 for forming a tight seal between the parts.

The carburetor housing 11 comprising a hollow interior configuration has a fuel reservoir 20 mounted on ledge or flange 17 with a fuel intake pipe 21 extending therefrom and into the hollow interior of housing 11.

Reservoir 20 has the usual pivotally mounted float (not shown) which is mechanically associated with the known fuel metering valve associated with a fuel inlet 22. A suitable vent (not shown) provides atmospheric pressure within the reservoir, and fuel, such as gasoline, is caused to flow through fuel inlet 22 into the hollow interior of the fuel reservoir and through fuel pipe 21 into the hollow interior of carburetor housing 11.

As shown in FIG. 2, the conventional carburetor has one or more throats or venturies 23 into the center of which extends the fuel pipe 21 which forms the means for injecting fuel into the carburetor. Air flowing from opening 18 through the venturi or venturies 23 creates a region of a lower pressure therein thereby causing fuel to flow out of fuel pipe 21 into the air stream and thence into the cylinder or cylinders of the associated internal combustion engine.

This process, due to the limited mixing of fuel and air contributes to incomplete combustion of the fuel and results in the formation of carbon monoxide (CO) and unburned hydrocarbons.

The importance of the intimate mixing of fuel and air is adequately demonstrated in the known turbo-jet and gas turbine combustion systems. In these known devices a series of orifices in the combustor wall admit metered air into the fuel spray. Opposing air jets meet approximately in the center of the combustion chamber thereby creating a turbulent condition that intimately mixes fuel and air. The resulting combustion is virtually free from CO and is conducted at a heat release rate of approximately $7 \times 10^6$ BTU/hour/atmosphere/FT$^3$. The heat release rate of only 20,000 BTU/hour/FT$^3$ is considered normal for furnace type combustion systems that do not adequately mix fuel and air.

The purpose of this invention is to provide a simple means of adding the necessary turbulence to the fuel air mixture to improve combustion efficiency. This is achieved by decreasing the throat or venturi area 23 of the carburetor 10 down to the minimum necessary to induce fuel flow through the main jet or jets herein shown as the fuel pipe 21.

To accomplish this purpose the venturi of the carburetor 10, which is shown in the drawing for purposes of illustration as being the known Volkswagen SOLEX model 28 PICT-1, is provided with a sleeve 24 for inserting in the venturi 23 of the carburetor. This sleeve defines a venturi neck down section 25 through the slotted sides of which projects the fuel pipe 21 with its jet opening 26 terminating axially in the center of the venturi section of the sleeve, as shown in FIG. 2.

Since the sleeve 24 reduces the normal size of venturi 23 in the carburetor housing 11 and the size of the air flow passage through the carburetor, additional provisions must be made to introduce air into the fuel air flow through the carburetor.

Accordingly, the housing throttle plate 12 comprises a part of a hollow throat extension 27. This throat extension is bolted to the bottom of housing 11 of the carburetor, as shown in FIG. 2, and to the manifold 28 of the associated internal combustion engine by bolts 29 and 30, respectively. A butterfly valve means 31 is mounted in the hollow interior 32 of the throat extension 27 to function in a normal known manner.

Three air inlet ports 32 are spacedly arranged to extend laterally through the housing forming the throat extension 27 and into its hollow interior 33 to form air inlet passageways. These passageways are intended to provide the additional air needed for complete fuel combustion and to compensate for the reduced air flow through the venturi section 25.

FIG. 7 illustrates a modification of the hollow throat extension 27 shown in FIGS. 5 and 6 wherein the throat extension 34 differs from extension 27 in that two pairs of air inlet ports 32 are shown.

It should be noted that by providing the reduced throat section of venturi 25 and reduced air flow therethrough that fuel from pipe line 21 is drawn therefrom and mixed with a first predetermined amount of air and then this air fuel mixture is further mixed downstream in a turbulent manner by the additional atmospheric air drawn into the hollow interior of the throat extension 27 through air inlet ports 32. Since the air from ports 32 is directed laterally into the hollow interior of the throat extension 27 engaging the air fuel stream from venturi section 25 in the center of its hollow interior extreme turbulence is generated which aerates the fuel more thoroughly than heretofore experienced in this type of carburetor. All of this action is possible with the known carburetors by the venturi forming sleeve 25 and the throat extension 27 which by its ports 32 compensates for any loss of air flow through the carburetor because of the sleeve insert.

A significantly improved carburetor is thus disclosed in accordance with the stated objects of the invention, and the shortcomings of the prior art are effectively overcome. Although one carburetor embodiment with only one venturi or throat configuration has been illustrated and described, it will be apparent to those skilled in the art that various changes and modifications may be made therein without departing from the spirit of the invention or from the scope of the appended claims.

What is claimed is:

1. A carburetor for mounting on an internal combustion engine comprising:
   a housing,
   a hollow mixing chamber provided within said housing and having an air inlet at one end and a fuel outlet at the other end of said housing,
   a fuel reservoir mounted adjacent said housing,
   a sleeve having a funnel shaped configuration for mounting in the interior of said chamber forming a venturi shaped opening positioned longitudinally of said housing tapering from a given diameter at said one end to a smaller diameter opening at said other end of said chamber,
   a fuel injection means interconnecting said reservoir with the interior of said venturi at a point adjacent its smaller diameter and substantially axially aligned with the longitudinal axis of the venturi whereby the lower pressure of air flowing through said venturi causes fuel to flow out of said fuel injection means into said venturi,
   the smaller diameter of said venturi being of a predetermined size large enough to cause a predetermined lower pressure therein sufficient to draw fuel out of said fuel injection means, and a hollow extension connected to said other end of said housing for receiving at one end the fuel and air mixture from said venturi and discharging it from its other end, said extension being provided with at least two spacedly arranged air inlet port means extending into the hollow interior of said extension substantially at right angles to the longitudinal axis of said extension for injection at all engine speeds through its fully opened ports atmospheric air into the fuel air mixture from said venturi passing therethrough, the injected air passing through said air inlet port means turbulently actuating said fuel air mixture and additionally adding the remaining necessary air needed for complete fuel combustion in the associated internal combustion engine.

2. The carburetor set forth in claim 1 wherein:

said air inlet port means comprises four air inlet ports equally spaced around the periphery of said extension.

3. The carburetor set forth in claim 1 wherein:

the periphery of said sleeve is slotted for receiving therethrough the outlet port of said fuel injection means.

* * * * *